(12) United States Patent
Gurung et al.

(10) Patent No.: US 10,305,837 B2
(45) Date of Patent: May 28, 2019

(54) METHODS AND SYSTEMS FOR ASSISTING IN CREATION OF A NEW ACCOUNT OF AN ONLINE SERVICE

(71) Applicant: FACEBOOK, INC., Menlo Park, CA (US)

(72) Inventors: Topraj Gurung, Redwood City, CA (US); Joshua James Ketellapper, San Francisco, CA (US); Edward Young Zhang, San Francisco, CA (US); Paul Chang, San Jose, CA (US)

(73) Assignee: FACEBOOK, INC., Menlo Park, CA (US)

( * ) Notice: Subject to any disclaimer, the term of this patent is extended or adjusted under 35 U.S.C. 154(b) by 254 days.

(21) Appl. No.: 15/387,474

(22) Filed: Dec. 21, 2016

(65) Prior Publication Data

US 2018/0123998 A1 May 3, 2018

Related U.S. Application Data

(60) Provisional application No. 62/415,401, filed on Oct. 31, 2016.

(51) Int. Cl.
*G06F 15/16* (2006.01)
*H04L 12/58* (2006.01)
*H04L 29/08* (2006.01)

(52) U.S. Cl.
CPC .............. *H04L 51/18* (2013.01); *H04L 51/04* (2013.01); *H04L 51/32* (2013.01); *H04L 67/02* (2013.01); *H04L 67/306* (2013.01)

(58) Field of Classification Search
CPC ......... H04L 51/04; H04L 51/18; H04L 51/32; H04L 67/306; H04L 65/1093
USPC .................................................. 709/204, 206
See application file for complete search history.

(56) References Cited

U.S. PATENT DOCUMENTS

2016/0212230 A1* 7/2016 Schneider ............... H04L 67/22

* cited by examiner

*Primary Examiner* — Wing F Chan
*Assistant Examiner* — Andrew Woo
(74) *Attorney, Agent, or Firm* — Morgan, Lewis & Bockius LLP

(57) ABSTRACT

A user of a user device with a first account with an online service selects a contact to invite to join the online service. A server receives the selected contact to invite from the user device, and in response to receiving the selected contact, generates a second account for the selected contact. The second account includes a plurality of fields, one or more of which are populated with contact information of the selected contact. A link to the second account is generated and provided in an invitation for the selected contact to activate the second account with the online service.

19 Claims, 11 Drawing Sheets

METHODS AND SYSTEMS FOR ASSISTING IN CREATION OF A NEW ACCOUNT OF AN ONLINE SERVICE

RELATED APPLICATION

This application claims priority and benefit to U.S. Provisional Application No. 62/415,401, filed Oct. 31, 2016, entitled "Methods and Systems for Assisting in Creation of a New Account of an Online Service," which is hereby incorporated by reference in its entirety

TECHNICAL FIELD

This relates generally to account creation for online services, including but not limited to creating a new user account with the help of an existing user with an account on an online service.

BACKGROUND

Social networks and instant messaging programs on electronic devices provide a convenient means of communications between individuals. Social networking has been growing in popularity, and new accounts on social networking sites are being created daily. Some users unfamiliar with the emerging technology and social networking can find it difficult to create new accounts. New users of other online services may also find it difficult to create new accounts.

SUMMARY

Accordingly, there is a need for methods, systems, and interfaces for assisting in the creation of a new account. For example, by initiating an account creation on a first device whose user already has an account, a second user without an account can have an easier time creating a new account on a second device.

In accordance with some embodiments, a method is performed at a first user device having one or more processors and memory storing instructions for execution by the one or more processors. The first user device is associated with a first user having a first account with an online service. The first user device receives a user input selecting a contact to invite to join the online service. The method further includes displaying a sign-up page for generating a second account for the selected contact with the online service, the sign-up page including a plurality of fields; populating one or more fields of the plurality of fields with contact information for the selected contact without receiving user input providing the contact information; and causing an invitation for the selected contact to activate the second account with the online service to be provided to a second user device associated with the selected contact.

In accordance with some embodiments, a first user device includes one or more processors, memory, and one or more programs. The one or more programs are stored in the memory and configured to be executed by the one or more processors. The one or more programs include instructions for performing the operations of the method described above for the client device. In accordance with some embodiments, a non-transitory computer-readable storage medium stores instructions that, when executed by the client device, cause the client device to perform the operations of the method described above.

In accordance with some embodiments, a method is performed at a server with one or more processors and memory storing instructions for execution by the one or more processors. The server is associated with an online service. The method includes receiving from a first user device associated with a first user having a first account with the online service, a selection of a contact to invite to join the online service. In response to receiving the selection, a second account for the selected contact with the online service is generated. The second account includes a plurality of fields. Generating the second account comprises populating one or more fields of the plurality of fields with contact information for the selected contact. A link to the second account is generated and the link is provided in an invitation for the selected contact to activate the second account with the online service.

In accordance with some embodiments, a server system associated with an online service includes a processor and memory storing one or more programs for execution by the processor. The one or more programs include instructions for performing the operations of the server-side method described above. In accordance with some embodiments, a non-transitory computer-readable storage medium stores instructions that, when executed by a server system, cause the server system to perform the operations of the server-side method described above.

BRIEF DESCRIPTION OF THE DRAWINGS

For a better understanding of the various described embodiments, reference should be made to the Description of Embodiments below, in conjunction with the following drawings. Like reference numerals refer to corresponding parts throughout the figures and description.

DESCRIPTION OF EMBODIMENTS

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first user device could be termed a second user device, and, similarly, a second user device could be termed a first user device, without departing from the scope of the various described embodiments. The first user device and the second user device are both user devices, but they are not the same user device.

The terminology used in the description of the various embodiments described herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

As used herein, the term "exemplary" is used in the sense of "serving as an example, instance, or illustration" and not in the sense of "representing the best of its kind."

Figure 1:
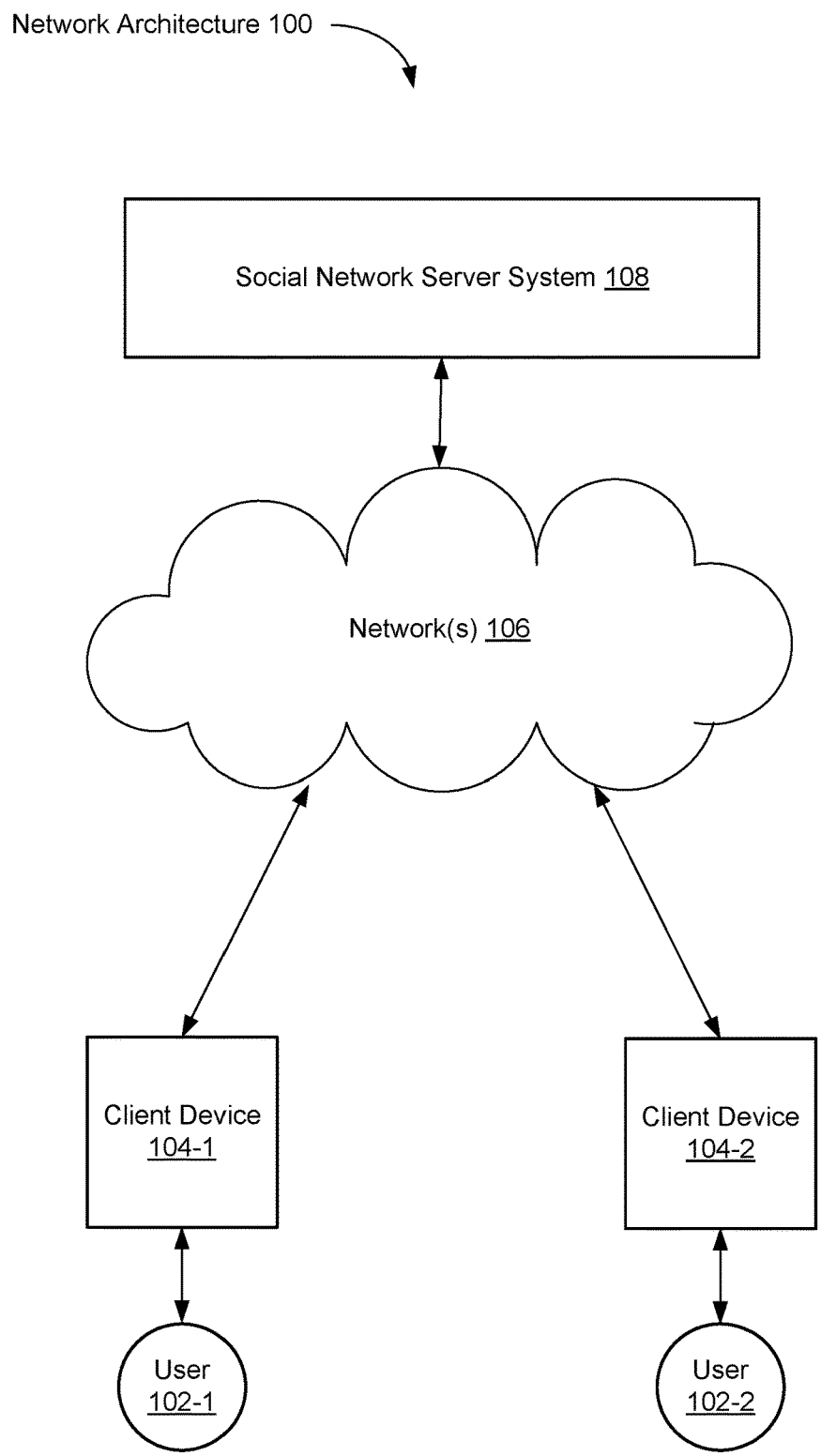
FIG. 1 is a block diagram illustrating an exemplary network architecture of a social network, in accordance with some embodiments.

FIG. 1 is a block diagram illustrating an exemplary network architecture 100 of a social network (or for another type of online service), in accordance with some embodiments. The network architecture 100 includes a number of client devices (also called "client systems," "client computers," "user devices," or "clients") 104-1, 104-2 communicably connected to an electronic social network system 108 (e.g., a server system) by one or more networks 106 (e.g., the Internet, cellular telephone networks, mobile data networks, other wide area networks, local area networks, metropolitan area networks, and so on). In some embodiments, the one or more networks 106 include a public communication network (e.g., the Internet and/or a cellular data network), a private communications network (e.g., a private LAN or leased lines), or a combination of such communication networks.

In some embodiments, the client devices 104-1 and 104-2 are computing devices such as smart watches, personal digital assistants, portable media players, smart phones, tablet computers, 2D gaming devices, 3D gaming devices, virtual reality devices, laptop computers, desktop computers, televisions with one or more processors embedded therein or coupled thereto, in-vehicle information systems (e.g., an in-car computer system that provides navigation, entertainment, and/or other information), and/or other appropriate computing devices that can be used to communicate with the social network system 108. In some embodiments, the social network system 108 is a single computing device such as a computer server, while in other embodiments, the social network system 108 is implemented by multiple computing devices working together to perform the actions of a server system (e.g., cloud computing).

User 102-1 employs the client device 104-1 to access the social network system 108 and to participate in corresponding social networking onboarding assistance. User 102-2 employs the client device 104-2 and does not initially have a corresponding social network online service account. User 102-2 receives assistance from user 102-1 of the first client device 104-1 and in some embodiments the server system 106 to create or onboard a new online service account (i.e., onboarding assistance). User 102-1 and client device 104-1 may be referred to as the first user and first user device. User 102-2 and client device 104-2 may be referred to as the second user and second user device.

In some embodiments, the social network system 108 is a server system for a social networking service provider that provides access to at least some services and/or features for third-party providers.

In connection with using or participating in a social networking service, the digital content that users may consume, provide, and/or otherwise interact with is accessible through various features or entry points of the social networking service. For example, digital content may be accessible and presented via one or more pages (e.g., user profile page, page for an entity or organization, etc.), feeds (e.g., a newsfeed, a user wall, a timeline, a notifications section for highlighting new/updates to digital content, etc.), applications, and/or other interfaces for specific types of digital content (e.g., interfaces for accessing private messages, accessing saved social network content, searching for social network content, etc.) maintained by and within the social networking service.

Figure 3:
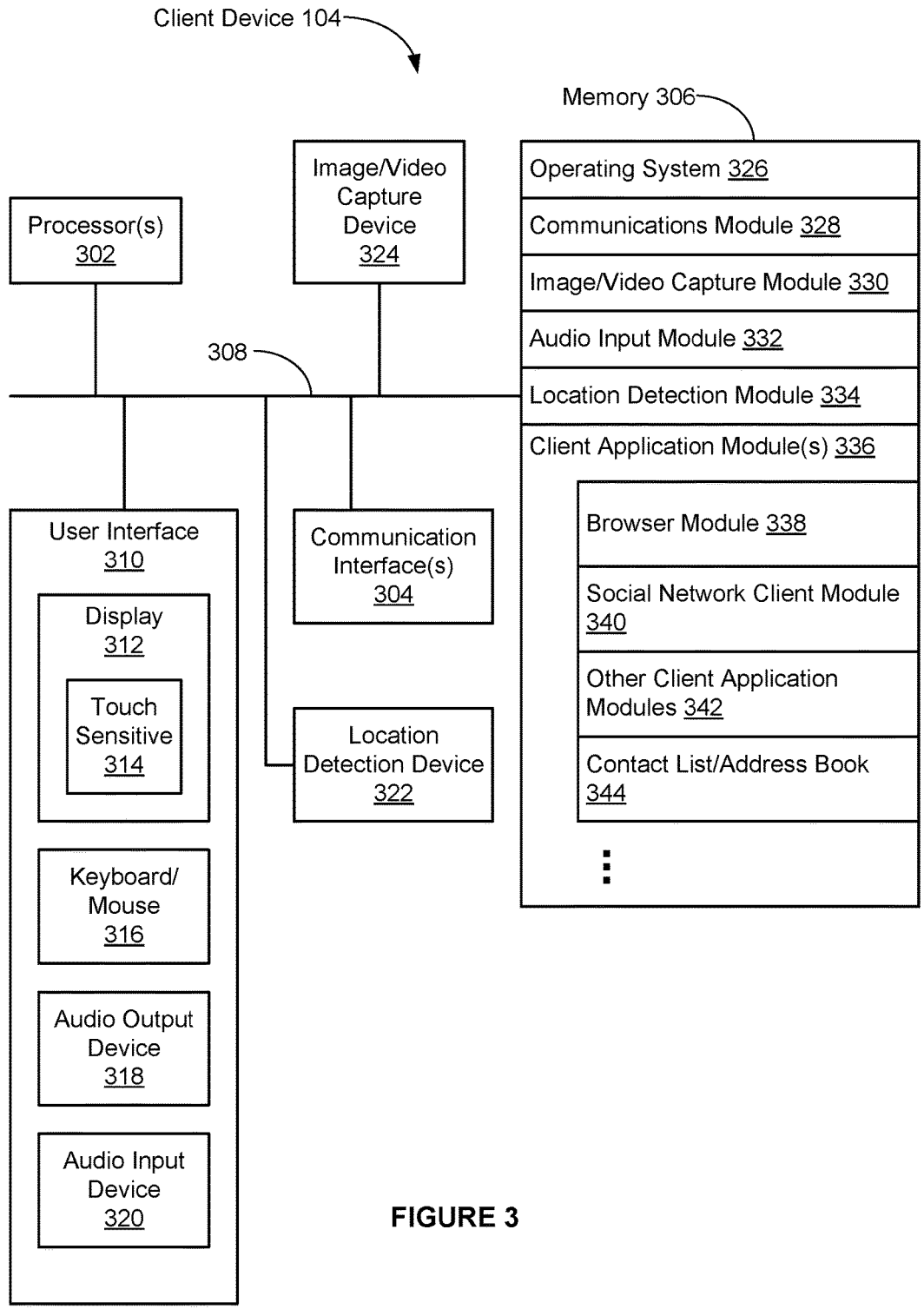
FIG. 3 is a block diagram illustrating an exemplary client device, in accordance with some embodiments.

In some embodiments, a software application executing on a mobile client device, with proper permissions, may obtain information from hardware resources/components of the client device (e.g., image/video capture device 324, location detection device 322, microphone, sensors, etc., FIG. 3). For example, a global navigation satellite system (GNSS) (e.g., the global positioning system (GPS), GLONASS, Magellan) or other geo-location capabilities (e.g., Wi-Fi or hybrid positioning systems) may be accessed by a software application on the client device (e.g., social network client module 340, FIG. 3) to determine the user's location and update the social network system 108 with the user's location (e.g., "At Home," "At Work," or "In San Francisco, Calif."), and/or update the social network system 108 with information derived from and/or based on the user's location.

In some embodiments, users may access third-party services by loading pages associated with third-party service providers within an application for a service provider distinct from the third-party service providers (e.g., by selecting links provided within social network client module 340 to access pages of a third-party service). Pages are a type of digital document that may include some common elements of other web documents (e.g., document includes markup language, such as Hyper Text Markup Language (HTML), Extensible Markup Language (XML), Java, etc.). Pages may also include script (e.g., JavaScript inserted into the page by the social network system 108) for calling one or more application programming interfaces (APIs) of a server system for the social networking service (e.g., one or more APIs of the social network system 108, FIG. 1) to obtain user information (e.g., location information, payment credentials, profile information, etc. collected and stored in connection with using the social networking service). The script may be executed at some time during a user's interaction with the loaded page (e.g., when the page is loaded, in response to a detected interaction within a loaded page, etc.).

Figure 2:
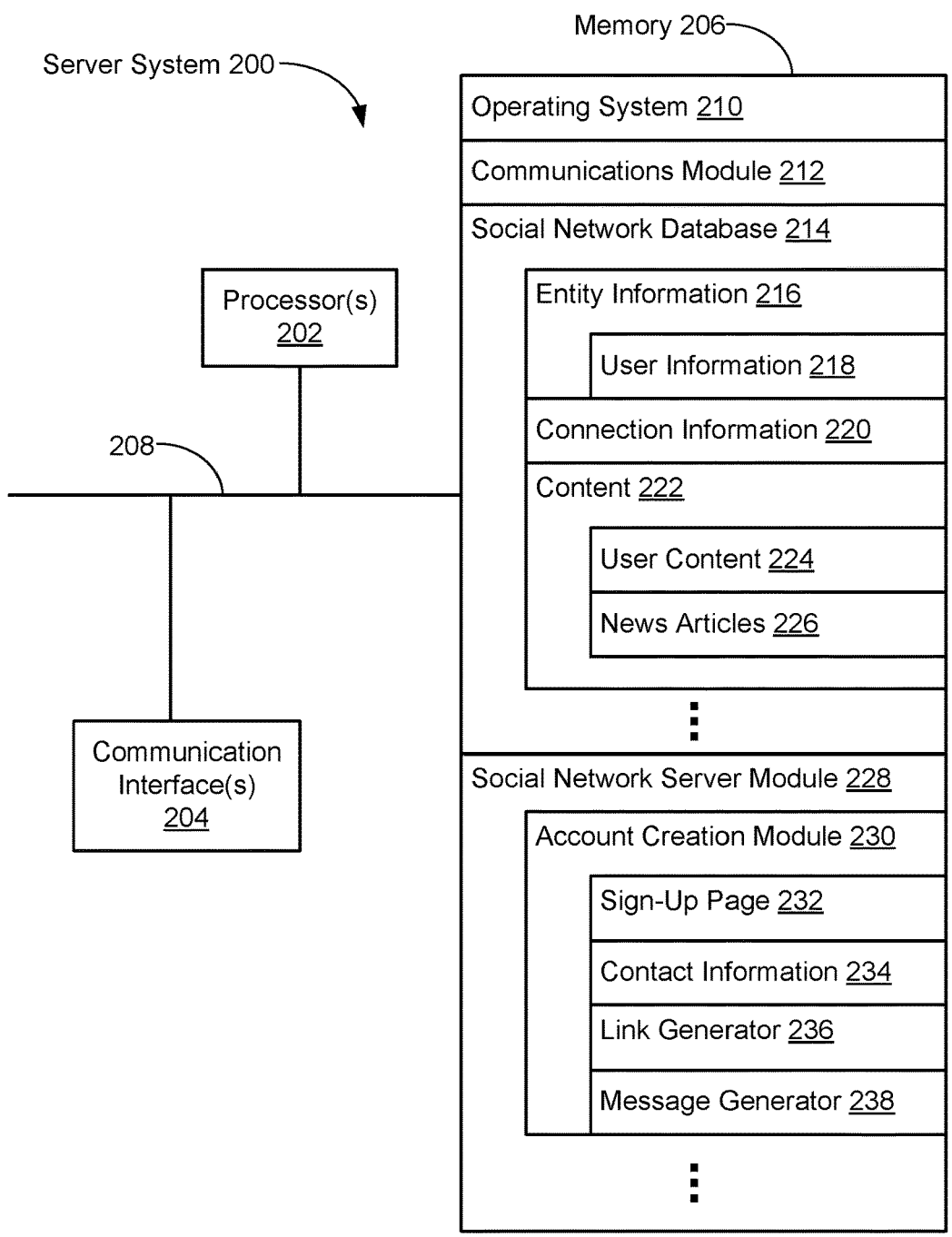
FIG. 2 is a block diagram illustrating an exemplary server system, in accordance with some embodiments.

FIG. 2 is a block diagram illustrating an exemplary server system 200 (e.g., social network system 108), in accordance with some embodiments. The server system 200 typically includes one or more processing units (processors or cores) 202, one or more network or other communications interfaces 204, memory 206, and one or more communication buses 208 for interconnecting these components. The communication buses 208 optionally include circuitry (sometimes called a chipset) that interconnects and controls communications between system components. The social network system 108 optionally includes a user interface (not shown). The user interface, if provided, may include a display device and optionally includes inputs such as a keyboard, mouse, trackpad, and/or input buttons. Alternatively or in addition, the display device includes a touch-sensitive surface, in which case the display is a touch-sensitive display.

Memory 206 includes high-speed random-access memory, such as DRAM, SRAM, DDR RAM, or other random-access solid-state memory devices; and may include non-volatile memory, such as one or more magnetic disk storage devices, optical disk storage devices, flash memory devices, and/or other non-volatile solid-state storage devices. Memory 206 may optionally include one or more storage devices remotely located from the processor(s) 202. Memory 206, or alternately the non-volatile memory device(s) within memory 206, includes a non-transitory computer-readable storage medium. In some embodiments, memory 206 or the computer-readable storage medium of memory 206 stores the following programs, modules and data structures, or a subset or superset thereof:

- an operating system 210 that includes procedures for handling various basic system services and for performing hardware dependent tasks;
- a network communication module 212 that is used for connecting the social network system 108 to other computers via the one or more communication network interfaces 204 (wired or wireless) and one or more communication networks (e.g., the one or more networks 106);
- a social network database 214 for storing data associated with the social networking service, such as:
  - entity information 216, such as user information 218, connection information 220; and
  - content 222, such as:
    - user content 224; and/or
    - news articles 226;
- a social network server module 228 for providing social networking services and related features (e.g., in conjunction with social network client module 340 on the client device 104, FIG. 3), which includes:
  - an account creation module 230 for generating an account for a new user to join the social network system, including:
    - a sign-up page 232 with fields for the new user to input personal information to create a new account;
    - contact information 234 for populating the sign-up page with corresponding contact information;
    - link generator 236 to generate a hyperlink associated with the sign-up page of the new account; and
    - message generator 238 to generate a message (e.g., instant message or SMS text message) to send to a user device 104-1, 104-2.

The social network database 214 stores data associated with the social network in one or more types of databases, such as graph, dimensional, flat, hierarchical, network, object-oriented, relational, and/or XML databases.

In some embodiments, the social network database 214 includes a graph database, with entity information 216 represented as nodes in the graph database and connection information 220 represented as edges in the graph database. The graph database includes a plurality of nodes, as well as a plurality of edges that define connections between corresponding nodes. In some embodiments, the nodes and/or edges themselves are data objects that include the identifiers, attributes, and information for their corresponding entities, some of which are rendered at clients 104 on corresponding profile pages or other pages in the social networking service. In some embodiments, the nodes also include pointers or references to other objects, data structures, or resources for use in rendering content in conjunction with the rendering of the pages corresponding to the respective nodes at clients 104.

Entity information 216 includes user information 218, such as user profiles, user profile pictures, a plurality of icons, login information, payment credentials (e.g., credit-card or debit-card information, bank information, etc. for conducting financial transactions through the social networking service), privacy and other preferences, biographical data, and the like. In some embodiments, for a given user, the user information 218 includes the user's name, profile picture, a plurality of icons, contact information, birth date, sex, marital status, family status, employment, education background, preferences, interests, and/or other demographic information.

In some embodiments, entity information 216 includes information about a physical location (e.g., a restaurant, theater, landmark, city, state, or country), real or intellectual property (e.g., a sculpture, painting, movie, game, song, idea/concept, photograph, or written work), a business, a group of people, and/or a group of businesses. In some embodiments, entity information 216 includes information about a resource, such as an audio file, a video file, a digital photo, a text file, a structured document (e.g., web page), or an application. In some embodiments, the resource is located in the social network system 108 (e.g., in content 222) or on an external server, such as third-party server 110.

In some embodiments, connection information 220 includes information about the relationships between entities in the social network database 214. In some embodiments, connection information 220 includes information about edges that connect pairs of nodes in a graph database. In some embodiments, an edge connecting a pair of nodes represents a relationship between the pair of nodes.

In some embodiments, an edge includes or represents one or more data objects or attributes that correspond to the relationship between a pair of nodes. For example, when a first user indicates that a second user is a "friend" of the first user, the social network system 108 transmits a "friend request" to the second user. If the second user confirms the "friend request," the social network system 108 creates and stores an edge connecting the first user's user node and the second user's user node in a graph database as connection information 220 that indicates that the first user and the second user are friends. In some embodiments, connection information 220 represents a friendship, a family relationship, a business or employment relationship, a fan relationship, a follower relationship, a visitor relationship, a subscriber relationship, a superior/subordinate relationship, a reciprocal relationship, a non-reciprocal relationship, another suitable type of relationship, or two or more such relationships.

In some embodiments, content 222 includes text (e.g., ASCII, SGML, HTML), images (e.g., jpeg, tif and gif), graphics (e.g., vector-based or bitmap), audio, video (e.g., mpeg), other multimedia, and/or combinations thereof. In some embodiments, content 222 includes executable code (e.g., script for API calls), podcasts, links, and the like.

In some embodiments, the social network server module 228 includes web or Hypertext Transfer Protocol (HTTP) servers, File Transfer Protocol (FTP) servers, as well as web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Python, Asynchronous JavaScript and XML (AJAX), XHP, Javelin, Wireless Universal Resource File (WURFL), and the like.

FIG. 3 is a block diagram illustrating an exemplary client device 104, in accordance with some embodiments. The client device 104 typically includes one or more processing units (processors or cores) 302, one or more network or other communications interfaces 304, memory 306, and one or more communication buses 308 for interconnecting these components. The communication buses 308 optionally include circuitry (sometimes called a chipset) that interconnects and controls communications between system components. The client device 104 includes a user interface 310. The user interface 310 typically includes a display device 312. In some embodiments, the client device 104 includes inputs such as a keyboard, mouse, and/or other input buttons 316. Alternatively or in addition, in some embodiments, the display device 312 includes a touch-sensitive surface 314, in which case the display device 312 is a touch-sensitive display. In some embodiments, the touch-sensitive surface 314 is configured to detect various swipe gestures (e.g., continuous gestures in vertical and/or horizontal directions) and/or other gestures (e.g., single/double tap). In client devices that have a touch-sensitive display 312, a physical keyboard is optional (e.g., a soft keyboard may be displayed when keyboard entry is needed). The user interface 310 also includes an audio output device 318, such as speakers or an audio output connection connected to speakers, earphones, or headphones. Furthermore, some client devices 104 use a microphone and voice recognition to supplement or replace the keyboard. Optionally, the client device 104 includes an audio input device 320 (e.g., a microphone) to capture audio (e.g., speech from a user). Optionally, the client device 104 includes a location detection device 322, such as a GNSS (e.g., GPS, GLONASS, Magellan, etc.) or other geo-location receiver, for determining the location of the client device 104. The client device 104 also optionally includes an image/video capture device 324, such as a camera or webcam.

In some embodiments, the client device 104 includes one or more optional sensors (e.g., gyroscope, accelerometer) for detecting a motion and/or change in orientation of the client device. In some embodiments, a detected motion and/or orientation of the client device 104 (e.g., the motion/change in orientation corresponding to a user input produced by a user of the client device) is used to manipulate an interface (or content within the interface) displayed on the client device 104.

Memory 306 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. Memory 306 may optionally include one or more storage devices remotely located from the processor(s) 302. Memory 306, or alternately the non-volatile memory device(s) within memory 306, includes a non-transitory computer-readable storage medium. In some embodiments, memory 306 or the computer-readable storage medium of memory 306 stores the following programs, modules, and data structures, or a subset or superset thereof:

- an operating system 326 that includes procedures for handling various basic system services and for performing hardware dependent tasks;
- a network communication module 328 that is used for connecting the client device 104 to other computers via the one or more communication network interfaces 304 (wired or wireless) and one or more communication networks, such as the Internet, cellular telephone networks, mobile data networks, other wide area networks, local area networks, metropolitan area networks, and so on;
- an image/video capture module 330 (e.g., a camera module) for processing a respective image or video captured by the image/video capture device 324, where the respective image or video may be sent or streamed (e.g., by a client application module 336) to the social network system 108;
- an audio input module 332 (e.g., a microphone module) for processing audio captured by the audio input device 320, where the respective audio may be sent or streamed (e.g., by a client application module 336) to the social network system 108;
- a location detection module 334 (e.g., a GNSS, Wi-Fi, or hybrid positioning module) for determining the location of the client device 104 (e.g., using the location detection device 322) and providing this location information for use in various applications (e.g., social network client module 340); and
- one or more client application modules 336, including the following modules (or sets of instructions), or a subset or superset thereof:
  - a web browser module 338 (e.g., Internet Explorer or Edge by Microsoft, Firefox by Mozilla, Safari by Apple, or Chrome by Google) for accessing, viewing, and interacting with web sites;
  - a social network module 340 for providing an interface to a social networking service (e.g., a social networking service provided by social network system 108) and related features, and for loading (e.g., within the interface for the social network module 340) pages associated with third-party service providers (e.g., to conduct transactions with the third-party service providers);
  - optional client application modules 342, such as applications for word processing, calendaring, mapping, weather, stocks, time keeping, virtual digital assistant, presenting, number crunching (spreadsheets), drawing, instant messaging, e-mail, telephony, video conferencing, photo management, video management, a digital music player, a digital video player, 2D gaming, 3D gaming, virtual-reality application, electronic book reader, and/or workout support; and/or
  - contact list and/or address book module 344 for storing contact information including names, phone numbers, and other personal information corresponding to the contact.

Each of the above identified modules and applications correspond to a set of executable instructions for performing one or more functions as described above and/or in the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 206 and/or 306 store a subset of the modules and data structures identified above. Furthermore, memory 206 and/or 306 optionally store additional modules and data structures not described above.

Figure 4A:
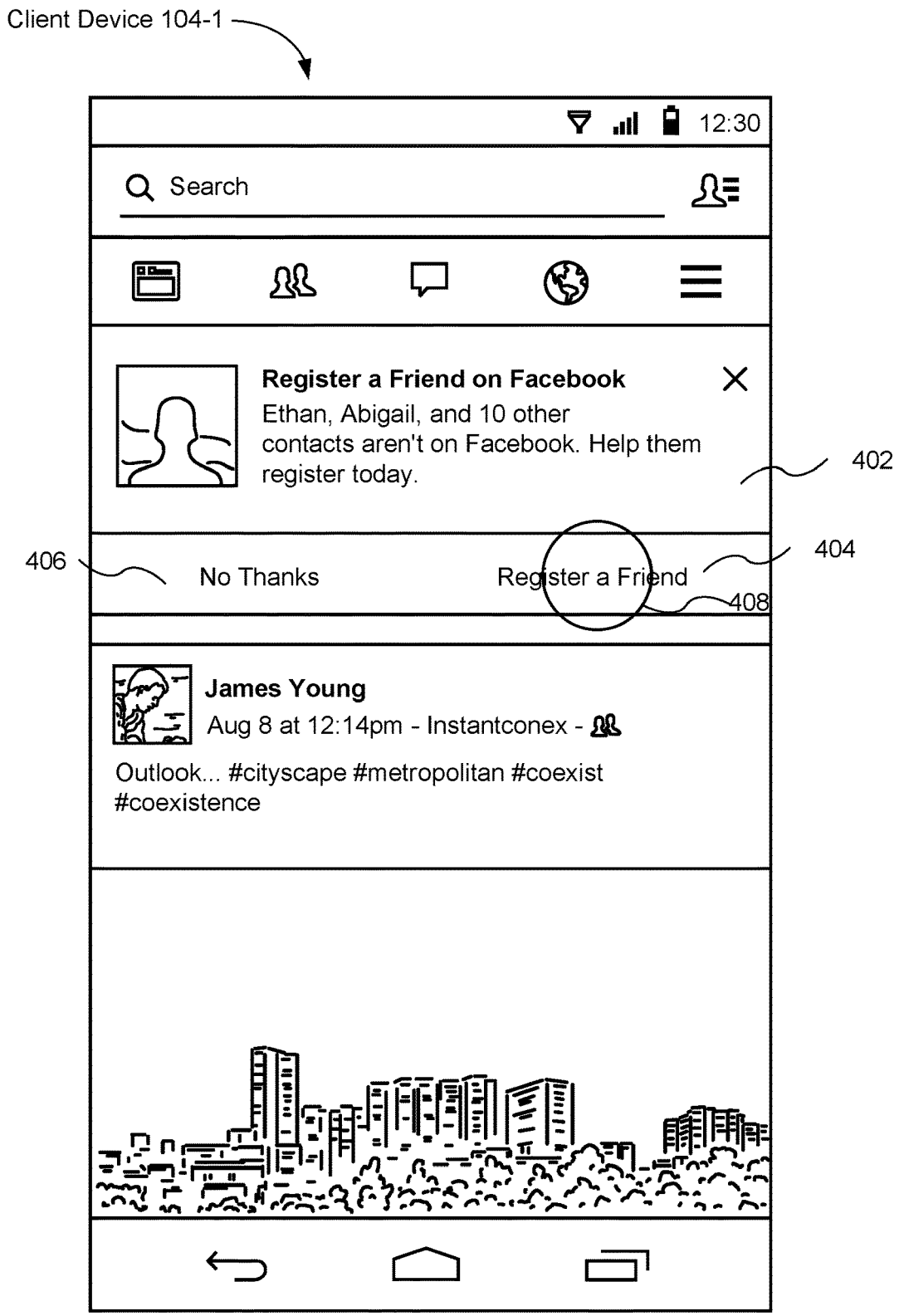
FIGS. 4A-4F illustrates exemplary graphical user interfaces (GUIs) on a client device for registering a contact without an account on an online service in accordance with some embodiments.

Attention is now directed towards embodiments of graphical user interfaces ("GUIs") and associated processes that may be implemented on a client device (e.g., the client device 104-1 in FIG. 4A).

FIGS. 4A-4F illustrate exemplary GUIs on a first client device 104-1 for assisting in creating a new user account for a second user 102-2 on a second client device 104-2. The GUIs shown may be provided by an application for a social networking service (e.g., social network client module 340, FIG. 3). The GUIs in these figures are used to illustrate the processes described below, including the method 500 (FIG. 5). While FIGS. 4A-4F illustrate examples of GUIs, in other embodiments, one or more GUIs display user-interface elements in arrangements distinct from the embodiments of FIGS. 4A-4F.

Figure 5A:
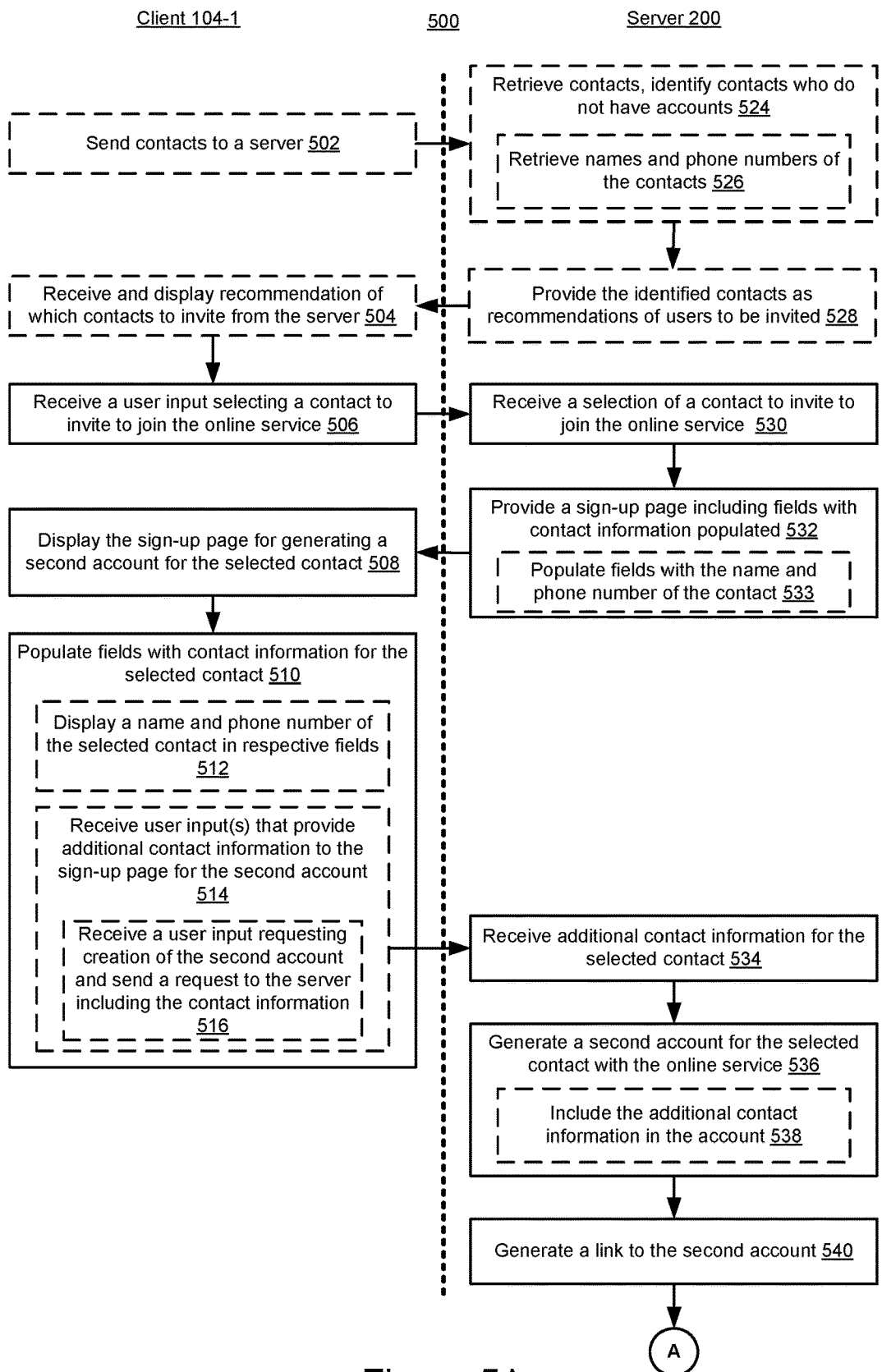
FIGS. 5A-5B illustrates a flow diagram illustrating a method of registering a contact without an account on an online service, in accordance with some embodiments.
Figure 5B:
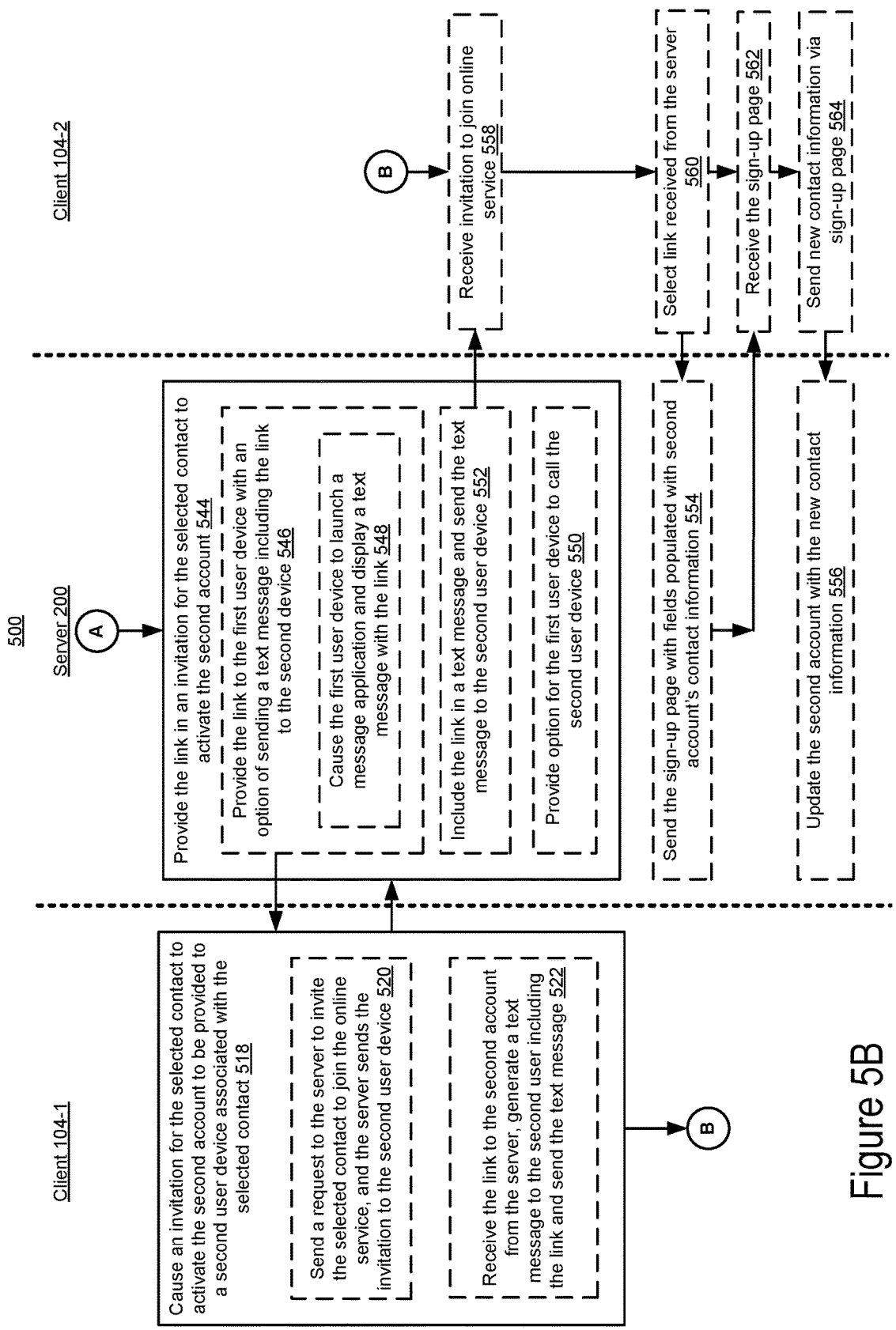

FIGS. 5A-5B are flow diagrams illustrating a method 500 of assisting a second user 102-2 on a second client device 104-2 (i.e., a second user device) to create a new user account.

The steps of the method 500 may be performed by a first client device 104-1 (FIGS. 1, 3, 4A-4F) (i.e., a first user device) and/or a server system 200 (FIG. 2) (e.g., social network server system 108, FIG. 1). FIGS. 5A-5B correspond to instructions stored in computer memory (e.g., memory 306 of the client device 104, FIG. 3; memory 206 of the social network system 108, FIG. 2) or another computer-readable storage medium. To assist with describing the method 500, FIG. 5 will be described with reference to the exemplary GUIs illustrated in FIGS. 4A-4F.

In some embodiments, in performing the method 500, the client device 104-1 sends 502 contacts to the server system 200. In some embodiments, the contacts from the client device 104-1 include names and phone numbers. The server system 200 thus retrieves 524 the contacts and identifies contacts without an account with the online service. In some embodiments, the names and phone numbers of contacts are retrieved 526. In some embodiments, the identified contacts are provided 528 to the client device 104-1 as recommendations of users to be invited to join the online service. For example, in FIG. 4A, the client device 104-1 displays a user interface with an option 404 to register a plurality of contacts from the first client device 104-1 identified as contacts without a user account with the online service. For example, FIG. 4A shows a user interface on the first client device 104-1, showing a notification section 402 with a list of contacts ("Ethan, Abigail, and 10 other contacts") identified as not having an account with the online service. An option to register 404 a contact 410 is shown below the notification section 402 along with a separate option to decline 406 initiating the onboarding assistance. In some embodiments, the option to register 404 a contact 410 is selected 408 by the first user.

Figure 4B:
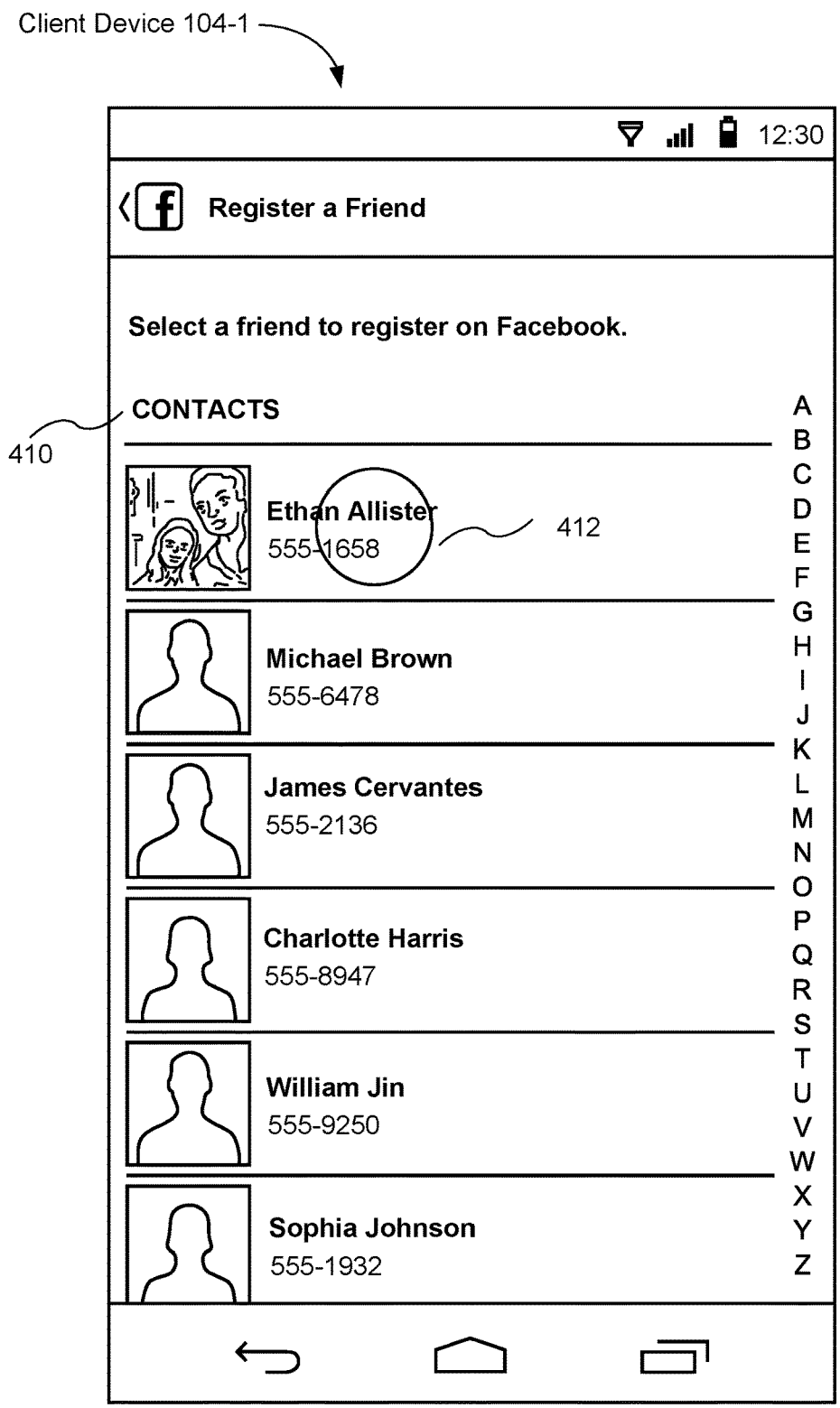

The client device 104-1 receives and displays 504 the recommendation of which contacts to invite. In some embodiments, the contact selected to invite to join the online services is selected from one or more recommendations provided by the server system 200. For example, FIG. 4B shows an alphabetized list of contacts 410 from the client device 104-1 who currently do not have accounts with the online service. The list of contacts 410 is displayed in response to the selection 408 (FIG. 4A) to register a friend.

A user input 412 selecting 506 a contact to join the online service is received at the client device 104-1. In some embodiments, this selection 506 is received 530 by the server system 200 as a contact to invite to join the online service. For example, FIG. 4B shows a contact "Ethan Allister" as the selected contact.

Figure 4C:
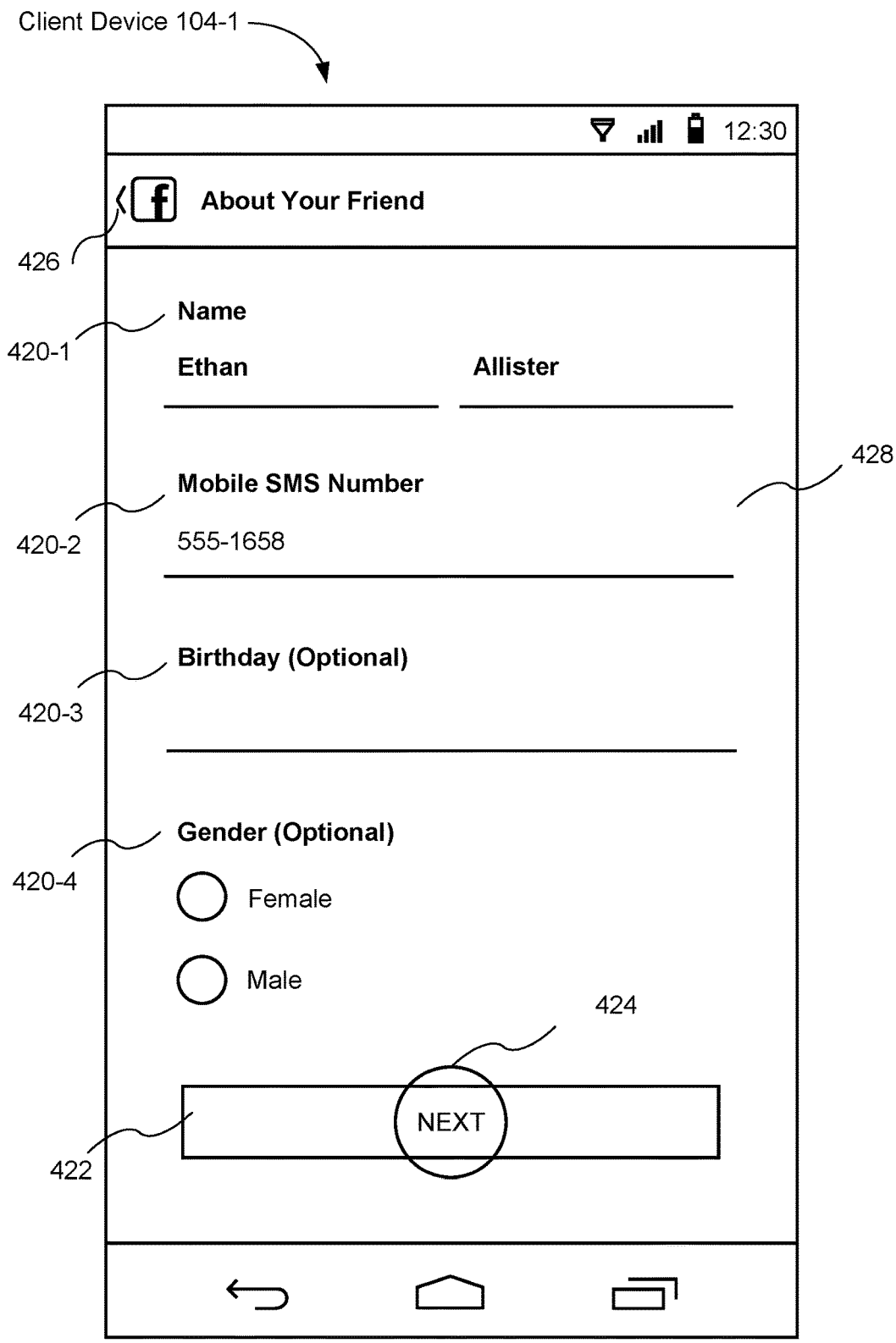
Figure 4D:
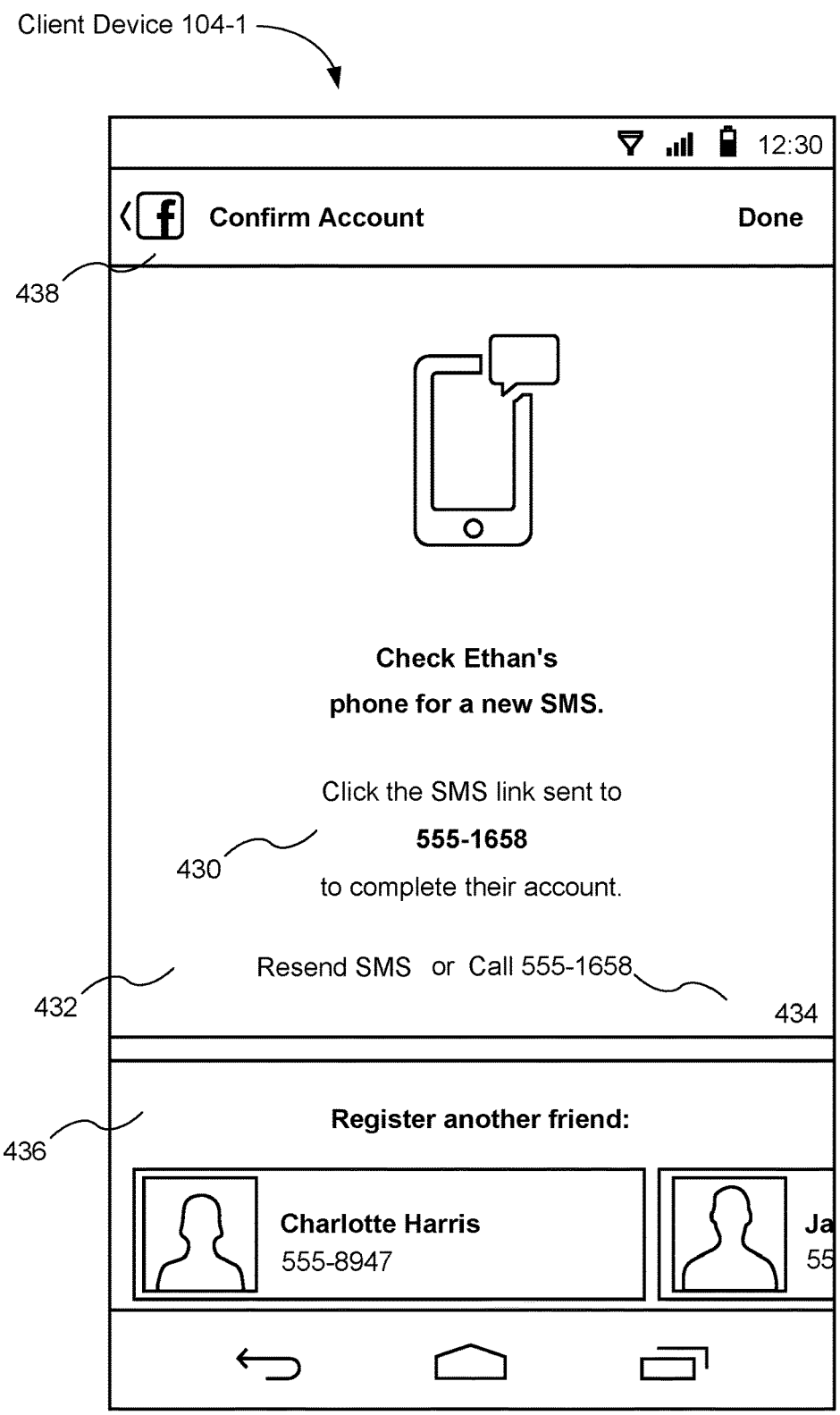

In some embodiments, a sign-up page including fields with contact information populated is provided 532 by the server system 200 to the client device 104-1. For example, fields for the name and phone number of the contact are populated 533 with the corresponding contact information. The provided sign-up page for generating a second account is displayed 508 on the client device 104-1. For example, FIG. 4C shows a sign-up page 428 on the client device 104-1 with contact information populated in the fields (e.g., first and last name 420-1, mobile SMS number 420-2). Alternatively, the sign-up page is generated by the first client device 104-1.

The client device 104-1 populates 510 fields of the sign-up page with contact information for the selected contact. In some embodiments, the name and phone number of the selected contact is displayed 512 in their respective fields. For example, FIG. 4C shows the user interface of the first client device 104-1 showing a sign up page 428 with the selected contact's information (e.g., 420-1, 420-2) populating some fields, but not other fields (e.g., 402-3, 402-4). As seen above, the contact information can be populated on the client device 104-1 or populated by the server system 200. An option 422 for the first user 102-1 of the client device 104-1 to proceed to the next step in the assisted onboarding is given. The user input 424 is shown selecting the option 422 to proceed with the onboarding. In addition, there is another option 426 to return to the previous screen.

In some embodiments, the client device 104-1 receives 514 one or more user inputs providing additional contact information to the sign-up page for the second account. For example, in FIG. 4C, the contact information 420-1, 420-2 can be edited and the optional contact information 420-3, 420-4 (e.g., birthday, gender) can be entered manually or left blank.

In some embodiments, the client device 104-1 receives a user input requesting creation of the second account and sends 516 the request, including the additional contact information, to the server system 200.

In some embodiments, the server system 200 receives 534 the additional contact information corresponding to the selected contact to be invited to join the online service.

The server system 200 generates 536 a second account for the selected contact with the online service. In some embodiments, the additional contact information received by the first client device 104-1 is included 538 in the account.

The server system 200 generates 540 a link to the second account and provides 544 the link in an invitation for the selected contact to activate the second account. For example, FIG. 4D displays a confirmation screen on the first client device 104-1 indicating that the second client device 104-2 has received an invitation to activate the second account. Multiple options are presented on the user interface to complete the activation of the second account. Options for resending 432 the message or calling 434 the contact 410 are presented. Another option 436 to register another contact 410 is presented. In addition, another option 438 allows the user to return to the previous screen.

In some embodiments, the link is provided 546 to the first client device 104-1 with an option of sending to the second client device 104-2 a text message, which includes the link to activate the second account. For example, the server system 200 causes the first client device 104-1 to launch 548 a message application and displays a message including the link to activate the second account. For example, a new message is created and addressed to the selected contact. A link to activate the second account is included in the text field in FIG. 4F. In a messaging application, a new message 450 addressed to the contact 410 is created. A text box 452 of the new message 450 includes text indicating further action is required to complete activation of the new account, and a corresponding link 454.

In some embodiments, the link to activate the second account is included 552 in a text message and the text message with the link included is sent from the server system 200 to the second device 104-2.

In some embodiments, the first client device 104-1 causes 518 the invitation for the selected contact to activate the second account to be provided to the second user device associated with the selected contact (i.e., to the second client device 104-2). For example, the first client device 104-1 sends 520 a request to the server system 200 to invite the selected contact to join the online service, and the server system 200 sends the invitation to the second client device 104-2.

In some embodiments, the first client device 104-1 receives 522 the link 454 to the second account from the server system 200 and generates a text message to the second user. The message, which includes the link from the server system 200, is sent to the second device 104-2.

Alternatively, the second client device 104-2 receives 558 the invitation to join the online service from the server system 200.

Figure 4E:
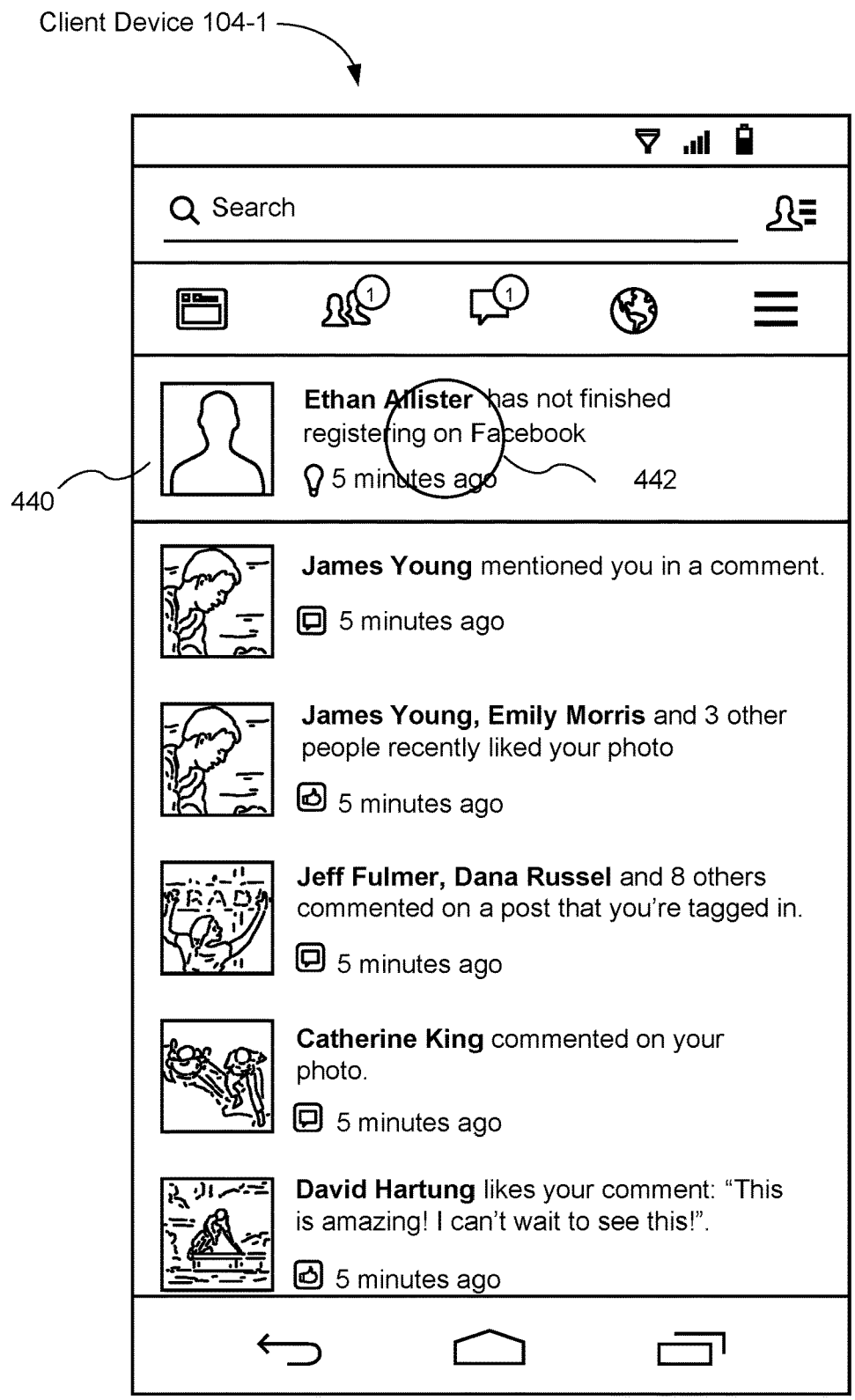
Figure 4F:
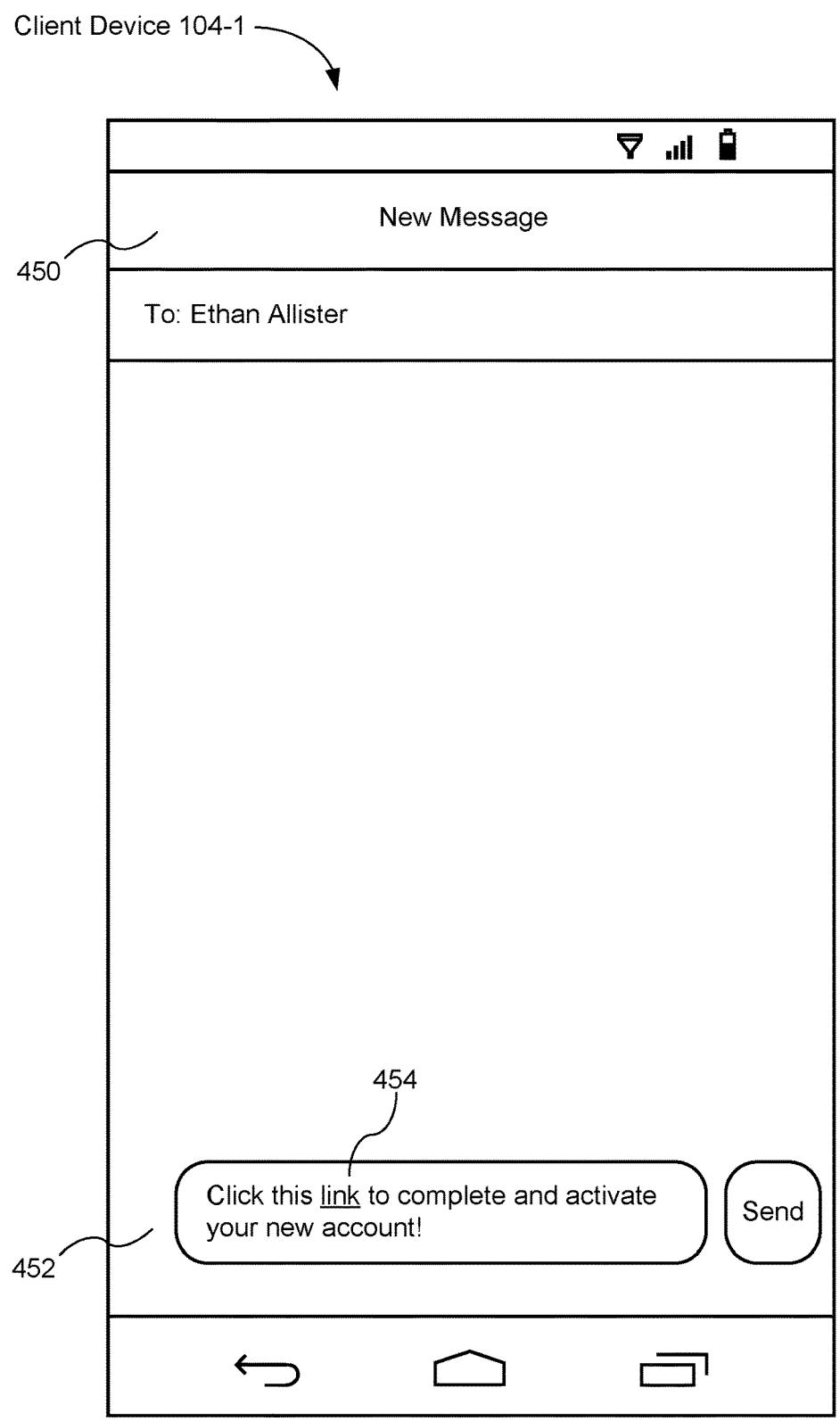

In some embodiments, the first client device 104-1 receives a notification from the online service that the selected contact has not finished registering the new account. For example, FIG. 4E shows a notification 440 that the selected contact has not finished registering on Facebook. If a user input 442 selecting the notification is detected, the user may take steps to encourage or remind the contact 410 of the pending acceptance of the second user account. Selection 442 of the notification may provide options for resending 432 the message or calling 434 the contact 410. The server system 200 thus may provide an option to the client device 104-1 to call the second client device 104-2.

In some embodiments, the second user of the second client device 104-2 selects 560 the link 454 to activate the newly created second account. In response, the server system 200 sends 554 the sign-up page with fields populated with the second account's contact information. The second client device 104-2 receives 562 the sign up page and may send 564 new or additional contact information back to the server system 200 through the sign-up page. In some embodiments, the server system 200 updates 556 the second account with the new or additional contact information provided by the second user of the second client device 104-2.

In some embodiments, the method 500 steps 506-518 are performed solely on the client device 104-1, without interacting with the server system 200.

While the method 500 includes a number of operations that appear to occur in a specific order, the method 500 can include more or fewer operations. For example, steps 502, 504, 524, 526, and 528 may be omitted, as may steps 554 and on. Some operations can be executed serially or in parallel, an order of two or more operations may be changed, and/or two or more operations may be combined into a single operation.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A method, comprising:
at a server having one or more processors and memory storing instructions for execution by the one or more processors, wherein the server is associated with an online service:
receiving contacts from a first user device associated with a first user having a first account with the online service;
identifying one or more contacts among the received contacts, the one or more contacts not having accounts with the online service; and
providing the one or more contacts to the first user device;
receiving, from the first user device, a selection of a contact from the one or more contacts to invite to join the online service;
in response to receiving the selection, generating a second account for the selected contact with the online service, the second account including a plurality of fields, wherein generating the second account comprises automatically populating one or more fields of the plurality of fields with contact information for the selected contact;
generating a link to the second account;
providing the link in an invitation to a second user device for the selected contact to activate the second account with the online service; and
sending a sign-up page from the server to the second user device in response to selection of the link at the second user device, wherein the skin-up page includes the plurality of fields, with the one or more fields automatically populated with the contact information.

2. The method of claim 1, wherein:
receiving the contacts of the first user from the first user device comprises receiving names and phone numbers of the contacts;
the plurality of fields includes a user-name field and a phone-number field; and
automatically populating the one or more fields comprises:
entering a name of the selected contact, as received from the first user device, in the user-name field; and
entering a phone number of the selected contact, as received from the first user device, in the phone-number field.

3. The method of claim 1, further comprising, at the server, providing a sign-up page to the first user device for display, wherein the sign-up page includes the plurality of fields with the contact information automatically populated in the one or more fields.

4. The method of claim 3, wherein:
the method further comprises receiving at the server, from the first user device, one or more user inputs for respective fields of the plurality of fields in the sign-up page, wherein the one or more user inputs provide additional contact information for the selected contact; and
generating the second account comprises including the additional contact information in the second account.

5. The method of claim 1, wherein providing the link comprises:
including the link in a text message; and
sending the text message from the server to a second user device associated with the selected contact.

6. The method of claim 1, wherein providing the link comprises providing, to the first user device, a first option of sending a text message that includes the link from the first user device to the second user device.

7. The method of claim 6, wherein providing the link further comprises, in response to selection of the first option:
causing the first user device to launch a message application; and
causing the first user device to display a text message directed to the second user device in the message application, wherein the text message includes the link.

8. The method of claim 6, further comprising providing, to the first user device, a second option of calling the second user device, wherein selection of the second option causes the first user device to call the second user device.

9. The method of claim 1, further comprising:
receiving new contact information for the selected contact from the second user device via the sign-up page; and
updating the second account with the new contact information.

10. A method, comprising:
at a first user device having one or more processors and memory storing instructions for execution by the one or more processors, the first user device being associated with a first user having a first account with an online service:
sending contacts of the first user to a server associated with the online service;
receiving, from the server, one or more recommendations of contacts to be invited to join the online service, wherein the one or more recommendations include contacts not having accounts with the online service displaying the one or more recommendations;
receiving a user input selecting a contact, from the one or more recommendations, to invite to join the online service;
displaying a sign-up page for generating a second account for the selected contact with the online service, the sign-up page including a plurality of fields;
automatically populating one or more fields of the plurality of fields with contact information for the selected contact, without receiving additional user input providing the contact information;
receiving a link to activate the second account with the online service from the server associated with the online service; and
causing an invitation for the selected contact to activate the second account with the online service to be provided to a second user device associated with the selected contact, the invitation including the link to activate the second account using a sign-up page with one or more fields of a plurality of fields automatically populated with the contact information for the selected contact.

11. The method of claim 10, wherein:
the contacts of the first user sent to the server have respective names and respective phone numbers;
the plurality of fields includes a user-name field and a phone-number field; and
automatically populating the one or more fields of the sign-up page comprises:
displaying a name of the selected contact in the user-name field; and
displaying a phone number of the selected contact in the phone-number field.

12. The method of claim 10, further comprising, at the first user device:
receiving one or more additional user inputs in one or more additional fields of the plurality of fields in the sign-up page, wherein the one or more additional user inputs provide additional contact information for the selected contact; and
providing the additional contact information for inclusion in the second account.

13. The method of claim 10, further comprising, at the first user device:
in response to receiving the link, generating a text message directed to the second user device, the text message including the link; and
sending the text message to the second user device.

14. The method of claim 13, wherein the user input selecting the contact is a first user input, the method further comprising, at the first user device:
after displaying the sign-up page, receiving a second user input requesting creation of the second account using contact information specified in the sign-up page; and
sending to the server a request corresponding to the second user input and including the contact information specified in the sign-up page;
wherein the link is received in response to the request.

15. The method of claim 10, wherein causing the invitation to be provided to the second user device comprises sending a request to the server to invite the selected contact to join the online service, wherein the server sends the invitation to the second user device in response to the request.

16. A non-transitory computer-readable storage medium storing one or more programs for execution by one or more processors of an electronic device, the one or more programs including instructions for:
sending contacts stored in the electronic device to a server associated with an online service;
receiving, from the server, one or more recommendations of contacts to be invited to join the online service, wherein the one or more recommendations include contacts not having accounts with the online service; and
displaying the one or more recommendations on the electronic device;
receiving a user input selecting a contact from the one or more recommendations to invite to join the online service;
displaying a sign-up page for generating a new account for the selected contact with the online service, the sign-up page including a plurality of fields;
automatically populating one or more fields of the plurality of fields with contact information for the selected contact, without receiving additional user input providing the contact information;

receiving a link to activate the second account with the online service from the server associated with the online service; and causing an invitation for the selected contact to activate the new account with the online service to be provided to a second user device associated with the selected contact, the invitation including the link to activate the second account using a sign-up page with one or more fields of a plurality of fields automatically populated with the contact information for the selected contact.

17. The non-transitory computer-readable storage medium of claim 16, wherein the one or more programs further include additional instructions for:

receiving one or more user inputs in one or more additional fields of the plurality of fields in the sign-up page, wherein the one or more user inputs provide additional contact information for the selected contact; and providing the additional contact information for inclusion in the new account.

18. The non-transitory computer-readable storage medium of claim 16, wherein the one or more programs further include additional instructions for:

in response to receiving the link, generating a text message directed to the second user device, the text message including the link; and sending the text message to the second user device.

19. The non-transitory computer-readable storage medium of claim 16, wherein causing the invitation to be provided to the second user device comprises sending a request to the server to invite the selected contact to join the online service.

\* \* \* \* \*

UNITED STATES PATENT AND TRADEMARK OFFICE
CERTIFICATE OF CORRECTION

PATENT NO. : 10,305,837 B2
APPLICATION NO. : 15/387474
DATED : May 28, 2019
INVENTOR(S) : Gurung et al.

Page 1 of 1

It is certified that error appears in the above-identified patent and that said Letters Patent is hereby corrected as shown below:

In the Claims

Claim 1, Column 12, Line 46, please delete "the skin-up page" and insert --the sign-up page--.

Signed and Sealed this
Sixth Day of August, 2019

Andrei Iancu
*Director of the United States Patent and Trademark Office*